Nov. 4, 1930.  A. D. PENTZ  1,780,656

FLUID PRESSURE BRAKE

Filed June 2, 1926   2 Sheets-Sheet 1

Nov. 4, 1930.  A. D. PENTZ  1,780,656
FLUID PRESSURE BRAKE
Filed June 2, 1926   2 Sheets-Sheet 2
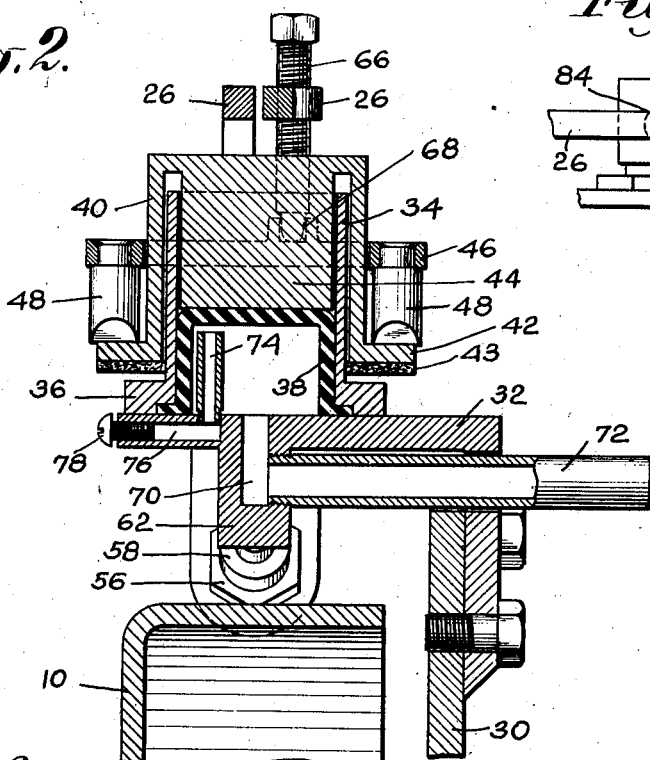
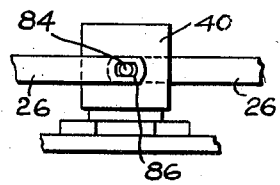
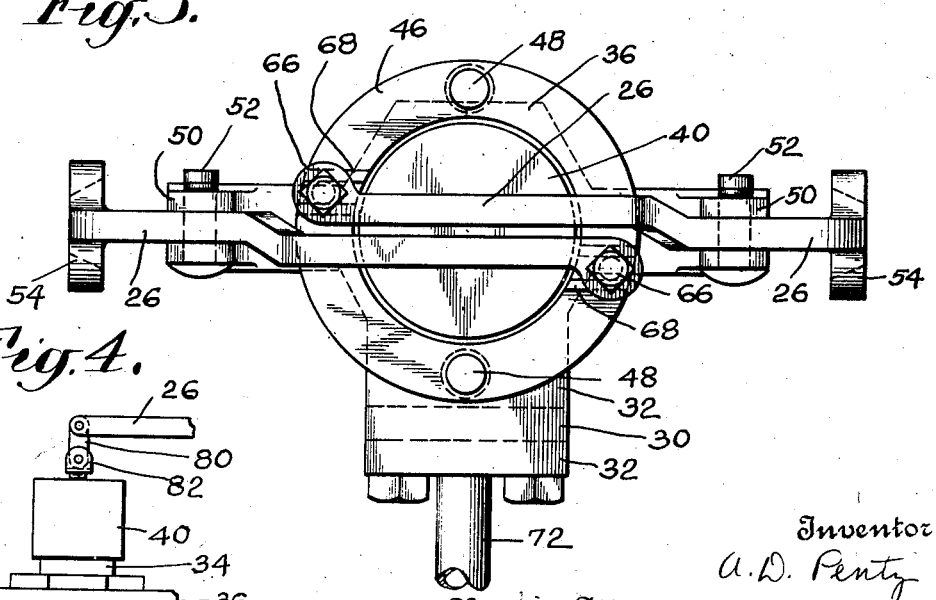
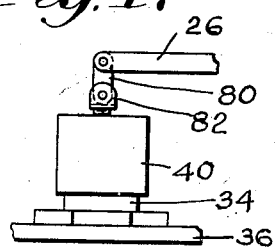
Inventor
A. D. Pentz
By his Attorneys
Cooper, Kerr & Dunham Patented Nov. 4, 1930

1,780,656

UNITED STATES PATENT OFFICE

ALBERT D. PENTZ, OF NEW BRIGHTON, NEW YORK, ASSIGNOR TO PENTZ MOTOR BRAKE CORPORATION, OF NEW BRIGHTON, NEW YORK, A CORPORATION OF NEW YORK

FLUID-PRESSURE BRAKE

Application filed June 2, 1926. Serial No. 113,131.

This invention pertains to fluid pressure brakes for vehicles, particularly automobiles.

Such devices are commonly called "hydraulic brakes" and are usually applied to all the wheels of the vehicle.

Hydraulic brakes as at present constructed are open to many objections. For instance, they are so designed that dirt and grit can find its way readily to the vital working parts of the device. The method of transmitting power from the cylinders is such as to cause side thrust between cylinders and pistons, thereby leading to rapid wear especially when aggravated by dirt and grit.

The above drawbacks are entirely obviated by my present invention, because I take off the power from my cylinder axially in a manner which prevents side thrust between cylinder and piston, and because dirt and grit are prevented from reaching the vital working parts of cylinder and piston.

Another object is to apply power from my cylinder through an equalizing device to insure equal distribution of the power to the brake sections.

Another object of my invention is to prevent leakage of working fluid through my piston and cylinder.

Another object is to use a single cylinder and piston at each wheel, instead of the former practice of one cylinder and two pistons, or vice versa.

Another object is to provide a lever system which is readily changeable in multiple to adapt it to various conditions and requirements of service.

Another object is to provide easily accessible and easily operable adjusting devices in the levers between the cylinder and brake bands.

Another object is to provide a mechanism simple and substantial in construction, cheap to manufacture, and easy to keep in repair.

Further and other objects and advantages will be hereinafter set forth in the accompanying specification and claims, and shown in the drawings, which by way of illustration show what is now considered to be the preferred embodiment of the invention.

Fig. 2 is a section on line 2—2 of Fig. 1.

Fig. 3 is a plan view on line 3—3 of Fig. 1.

Fig. 4 is a detail view of a modification in which a single brake lever is used.

Fig. 5 is a detail view of a modification in which the brake levers are connected to the cylinder without the use of equalizers.

Figure 1:
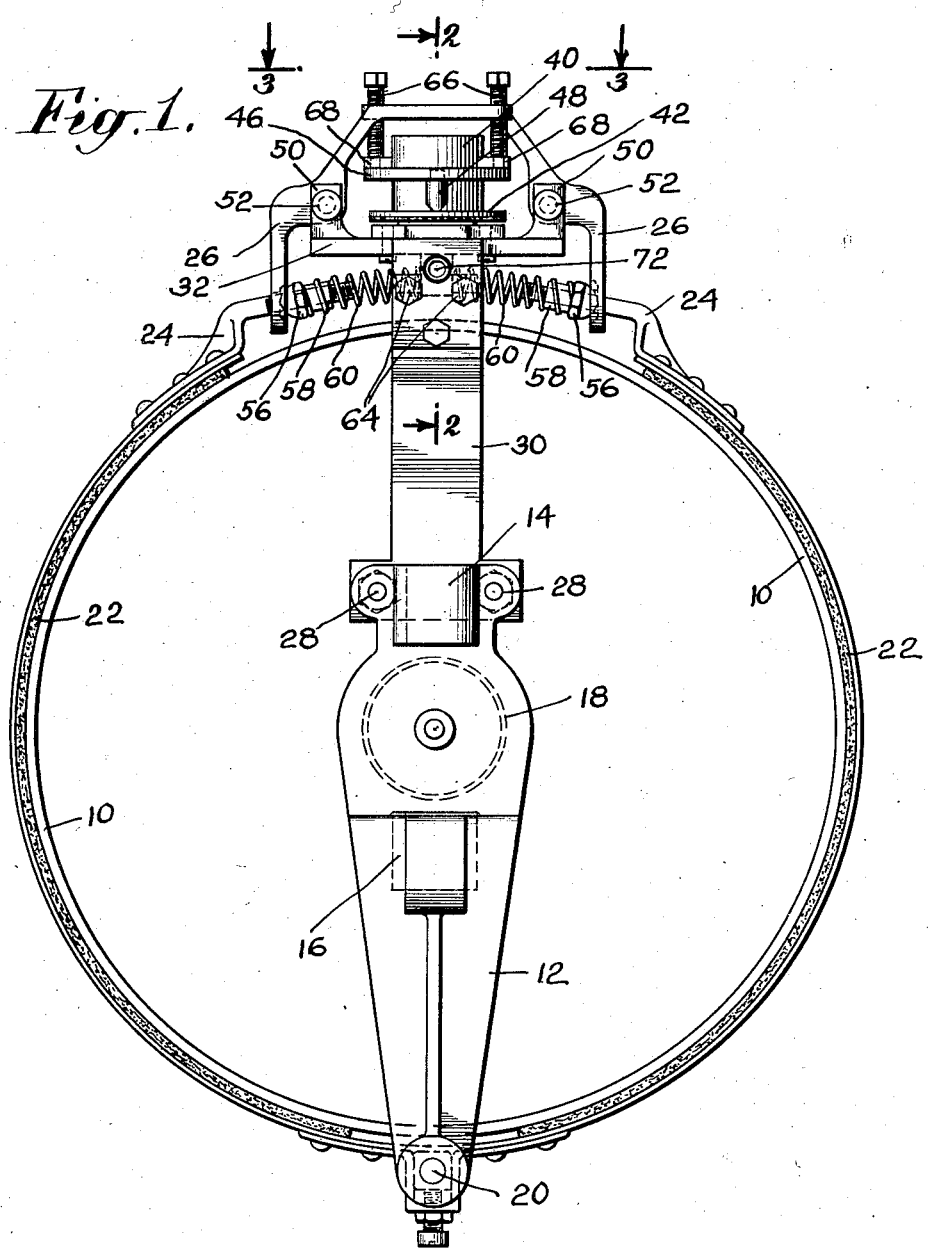
Fig. 1 is a side view of my device mounted to operate on a brake drum.

In Fig. 1, 10 is a brake drum arranged for mounting on the front wheel of an automobile. The steering knuckle 12 is arranged to be supported in upright position on the end of the axle by means of a pin through upper and lower sockets 14 and 16 respectively. The dotted circles 18 represent the bearings on which the wheel rotates.

Anchored at 20 on the lower end of steering knuckle 12 in the usual manner is the brake band 22, which almost completely surrounds the brake drum 10, the free upper ends of the brake band being provided with bolts 24 for the purpose of engaging the brake actuating levers 26.

Bolted at 28 to the upper end of steering knuckle 12 is the upwardly extending bracket 30, to which is fast the angle member or base plate 32 comprising the base and support for for the brake cylinder and levers.

Extending upwardly from base 32 is the open end cylinder or ring 34, bolted to base 32 through hexagon-shaped collar or flange 36, integral with ring 34.

Inside ring 34 and fitting it rather snugly is the hat-shaped extensible thrust member 38, its brim being clamped between base 32 and flange 36, and its crown extending upwardly inside ring 34.

I prefer to make member 38 of rubber, but it may be of other elastic, fluid-tight material.

Surrounding cylindrical ring 34 and fitting it snugly is an enclosing cylinder 40, provided at its lower edge with a horizontally extending flange 42, and at its closed upper end with a downwardly extending cylindrical piston-plug 44 which fits snugly the inside of ring 34 and rests on top of the extensible member 38. Secured to the under side of flange 42 is the felt washer 43 which helps to exclude dirt.

Loosely surrounding cylinder 40 is the horizontal ring 46, and extending downwardly from diametrically opposite points of ring 46 are the studs 48, the lower wedge-shaped ends of which rest upon ring 42.

Base 32 extends laterally to provide the upright pedestals 50, on which at 52 are pivotally supported the levers 26. The lower ends of levers 26 have eyes 54 as indicated by dotted lines in Fig. 3. The threaded ends of bolts 24 pass through eyes 54 and are fitted with nuts 56 which have spherical ends seated in the eyes 54. Surrounding the hub-like ends 58 of nuts 56 are the compression springs 60. The ends of springs 60 abut against nuts 56 and projection 62 of base 32, and are held in operative position by hubs 58 and projections 64 on base 32 (Fig. 1).

The upper ends of levers 26 are formed to extend horizontally above the top of cylinder 40 and are fitted at their free ends with vertical adjusting screws 66; the lower ends of which rest in slots 68 located diametrically opposite each other on ring 46.

Fluid is admitted to the interior of 38 through passage 70 and pipe 72, to the free end of which a hose pipe is usually attached. Any air entrapped in the top of 38 escapes through pipe 74 and passage 76 when screw 78 is removed or loosened.

The operation of the device is as follows: When pressure is applied to the fluid in cap 38 through pipe 72, member 38, being expansible, and being permitted to expand in only one direction, forces plug 44, cylinder 40, flange 42, studs 48, ring 46 and screws 66 upwardly. This movement rotates levers 26 about their pivot points 52, and moves the lower ends of levers 26 inwardly against springs 60, thus drawing the two halves of brake band 22 tightly against brake drum 10. When the fluid pressure is released, springs 60 force all parts back to normal position, including the operating fluid.

It will be noted that movement of cylinder 40 is transmitted to levers 26 through studs 48 and ring 46. Since studs 48 and ring 46 are free to rock on flange 42 it is evident that ring 46 acts as an equalizer to distribute the power of cylinder 40 evenly to levers 26 and bolts 24.

It will be noted also that this arrangement permits changes of multiple of levers by changing the lengths of the upper arms of the levers. If the lengths of the levers are changed, they are also bent or moved sidewise so that screws 66 will always rest in the diametrically opposite sockets or slots 68, ring 46 being rotated to correspond.

The construction described above imposes no side thrust on the cylinder, and cylinder 40 is free to rotate, consequently any slight wear that occurs is distributed evenly around cylinder 40 and ring 34.

The only place where dirt or grit has access to the cylinder and ring is on ring 34, in the space between flange 36 and felt washer 43. Any dirt on the surface of ring 34 at that point is wiped off every time cylinder 40 returns to normal. Any slight wear at that point does no harm anyhow, because ring 34 extends so far into cylinder 40 that there is always plenty of bearing surface to guide the parts relatively to each other.

Since the entire fluid enclosing system is absolutely closed in my preferred design, there is no opportunity whatever for leakage past plungers as in previous designs.

My design simplifies the entire apparatus, because I use only one cylinder instead of two, as is usual in previous designs.

My screws 66 afford a very convenient means of adjusting the positions of levers 26.

I have illustrated and described my invention as applied to an external contracting type of brake in two sections but with slight mechanical modifications it can be applied equally well to internally expanding brakes, and may be used equally well if the brake has more or less sections than two. For instance it may be used in connection with brakes having a single band anchored at one end and actuated only at the other end.

In the modification shown in Fig. 4 a single brake lever 26 is connected by means of link 80 and stud 82 directly to the center of the head of cylinder 40. Stud 82 is threaded into cylinder 40 to provide adjustment, and the use of link 80 prevents side thrust on the cylinder. If desired, lever 26 may bear directly on the head of the cylinder in accordance with common practice but such an arrangement is not desirable as considerable side thrust is created due to the sliding of lever 26 on the cylinder.

Fig. 5 shows a modification in which two or more levers 26 are connected to cylinder 40 by means of studs 84 set symmetrically around the cylinder. In this arrangement no equalizer is used, but it will be noted that no lateral clearance is needed between studs 84 and the sides of slots 86 in levers 26 because when the ends of the levers move up and down cylinder 40 will rotate on ring 34 to accommodate the slight lateral movement of the ends of the levers.

It is to be understood that the invention is not limited to the construction herein specifically illustrated but can be embodied in other forms without departure from its spirit.

I claim—

1. In a fluid pressure brake system, in combination, a fluid-tight elastic thrust member, an enclosing ring surrounding said thrust member, a plug resting on said member and guided by said ring for axial movement therein, a brake band in two sections, and mechanism including said plug for interconnecting said thrust member and said sections to transmit the thrust of said thrust member equally to both said brake sections.

2. In a fluid pressure brake system, in combination, a brake drum, a brake band in sections, a member movable by fluid pressure, a lever connecting said member with each of said sections, each of said levers being operatively connected at one end to the periphery of said member at a substantial distance from the center thereof and at the other end to said brake band.

3. In a fluid pressure brake system, in combination with a fluid tight elastic thrust member, an enclosing ring surrounding said thrust member, a piston-like plug resting on said member and guided for axial movement by said ring, said plug being provided with an outwardly extending flange, a rockable ring resting on said flange, a brake band in two sections, and a lever operatively connected to each of said sections, the free ends of said levers resting on diametrically opposite points of said rockable ring whereby said ring acts as an equalizer to transmit equal thrust from the thrust member to each of said brake band sections.

In testimony whereof I hereto affix my signature.

ALBERT D. PENTZ.